(No Model.)
J. BLACKMORE & T. D. STEEN.
CASING FOR NATURAL GAS CONDUITS.
No. 347,084. Patented Aug. 10, 1886.
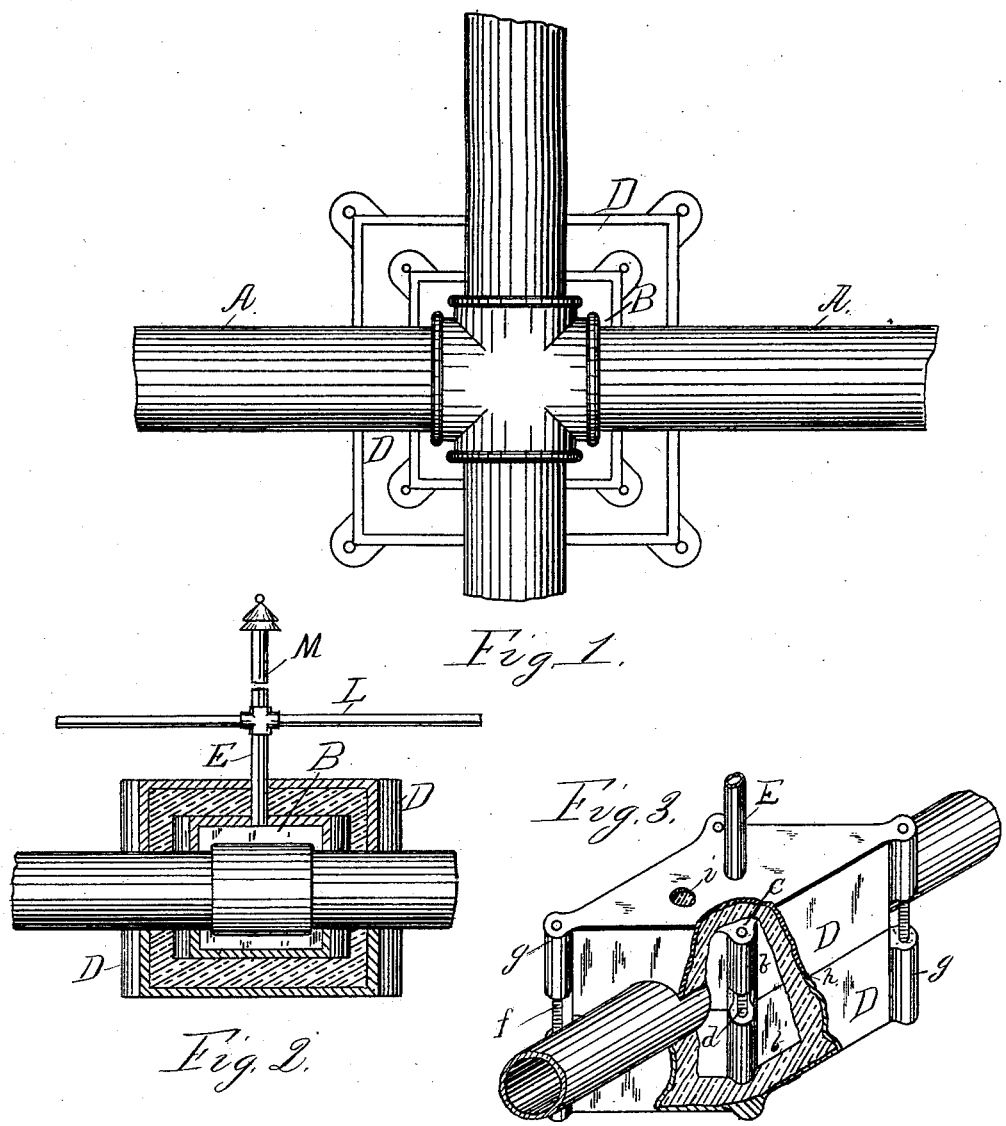
WITNESSES:
A. A. Moore,
N. N. Connolly
INVENTORS.
James Blackmore
Thomas D. Steen
BY Connolly Bros
ATTORNEYS.

UNITED STATES PATENT OFFICE.

JAMES BLACKMORE AND THOMAS D. STEEN, OF PUTNAM, PENNSYLVANIA.

CASING FOR NATURAL-GAS CONDUITS.

SPECIFICATION forming part of Letters Patent No. 347,084, dated August 10, 1886.

Application filed January 29, 1886. Serial No. 190,203. (No model.)

*To all whom it may concern:*

Be it known that we, JAMES BLACKMORE and THOMAS D. STEEN, citizens of the United States, residing at Putnam P. O., in the county of Allegheny and State of Pennsylvania, have invented certain new and useful Improvements in Casings for Natural-Gas Conduits; and we do hereby declare the following to be a full, clear, and exact description of the invention, reference being had to the accompanying drawings, which form part of this specification.

This invention has relation to casings for the joints or couplings of gas-conduits, and particularly of such conduits as are intended for the conveyance of natural gas.

As is well known, natural gas is of such a subtle and penetrating character that it has been found almost, if not entirely, impracticable to prevent leakage of the gas at the joints or couplings, and such leakage-gas penetrating the porous earth finds its way into localities where it becomes an element dangerous to life and property, on account of its high explosiveness when mixed with air.

In order to prevent the gas leaking from the joints from penetrating through the ground, it has been found expedient to surround the joints of conduits with chambered casings, into which the gas escapes, and to provide such casings with vent-pipes leading to and above the surface, for the purpose of carrying off the leakage to points where it may be burned. To render these casings effective and adequately provide for the escape of all the leakage-gas by way of the vent-pipes, it becomes necessary to tightly and hermetically seal the casing, as otherwise there will be an escape of gas through the joints and seams of the casing into and through the earth.

The object of our invention is to provide for gas-conduits a reliable and effective form of joint-casing, which may be applied readily to any of the conduits already laid, and which shall serve to receive leakage-gas and promote the escape thereof to and above the surface of the ground.

Our invention has for its object the provision of a double-joint casing of special construction, the inner and outer portions of which may be readily attached to or detached from the conduits now in use.

Our invention consists in the combination, with a gas main or conduit made in jointed sections, of the joint inclosing casings, each consisting of similar interior, and exterior box-like sections made in two halves, having lugs and bolted together, and a lead packing interposed between the two casings, as hereinafter described, and specifically claimed.

In the accompanying drawings, Figure 1 is a plan view showing the upper or lower sections of the two casings applied to a four-way joint. Fig. 2 is a vertical central section of our double casing applied to a conduit-joint and provided with the escape-pipes. Fig. 3 is a perspective view of our double casing applied to a joint.

A A designate the sections of the gas-conduit, which are coupled together by means of any of the approved forms of couplings.

B designates the inner or leakage casing applied to the joint, and for the purposes of our invention consisting of the two similarly-shaped boxes, $b\ b$, preferably of square or rectangular outline. The ends of these boxes or sections have semicircular recesses formed in them, so that they may embrace the pipe, as shown. At their corners or angles the boxes or sections $b\ b$ are formed with lugs $c\ c$, bored through for the reception of bolts or screws $d$, by which the two boxes are fastened securely together. An opening or aperture is formed in the top of the upper section for the connection of a vent or escape pipe, E, which leads above the surface of the ground.

D D designate the sections or boxes composing the outer casing. These are similar in construction and general form to the inner casing, and are secured together at their angles or corners in the same way—that is, by bolts $f\ f$ passing through lugs $g\ g$, as shown. The abutting edges of the two sections of the outer casing, and, if desired, those of the inner casing, are beveled, as shown at $h$, to render the joints closer and prevent leakage of packing material therethrough, particularly when the outer casing is being filled.

The inner and outer casings are separated by a shallow space, which is designed to receive the sealing material, preferably lead poured in in a molten condition. The upper section of the outer casing is provided with a hole or opening at $i$ for the reception of the sealing material, which opening may be closed by a cap, $k$, after the casing is filled. The lead or other material poured into the outer casing entirely and closely fills the same and effectually seals the joints formed around the inner casing, thus preventing all escape of gas, except by the escape-pipes. For the passage of the escape-pipe, the upper section of the outer casing has a hole bored through it, as shown.

In practice we should have located adjacent to the conduit a supplementary pipe, L, into which all the escape-pipes leading from the different casings would lead, and from this pipe L we would at intervals or at one point connect a pipe, M, leading above the surface, and, if desired, feeding a burner.

The conduit-casing above described has many advantages. Among others it embodies simplicity of construction, and is of comparatively low cost. The sections constituting the boxes may be cast in standard sizes and conveniently applied to standard sizes of pipe. The box-like or rectangular form of the boxes presents a large surface to the walls of the trench, or to the earth in which it is laid, and therefore sustains the pipes in level positions. The casing-sections may be applied to pipe already laid without necessitating the disturbance of the pipes or the joint-couplings.

The filling of the outer casing with lead or its equivalent absolutely prevents all leakage from the inner casing, and prevents the dangers incident to leakage.

We are aware that it is not broadly new to construct a casing for pipe-joints of interior and exterior boxes having an interposed filling to prevent leakage, and hence do not claim the same as our invention.

Having described our invention, what we claim, and desire to secure by Letters Patent, is—

The combination, with a gas main or conduit made in jointed sections, of the casings inclosing the joints, said casings consisting of the inner and outer box-like sections, B D, each made in two halves and formed with lugs $c\ c$, for the reception of the bolts $d\ d$ and the interposed lead packing, all constructed and arranged substantially as described.

In testimony that we claim the foregoing we have hereunto set our hands this 27th day of January, 1886.

JAMES BLACKMORE.
THOMAS D. STEEN.

Witnesses:
A. W. WALDIE,
CHARLES SMITH.